United States Patent
Wood et al.

(10) Patent No.: US 10,041,346 B2
(45) Date of Patent: Aug. 7, 2018

(54) COMMUNICATION USING ELECTRICAL SIGNALS TRANSMITTED THROUGH EARTH FORMATIONS BETWEEN BOREHOLES

(71) Applicants: Edward Wood, Kingwood, TX (US); Daniel Ernesto Sequera, Houston, TX (US)

(72) Inventors: Edward Wood, Kingwood, TX (US); Daniel Ernesto Sequera, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/367,833

(22) Filed: Dec. 2, 2016

(65) Prior Publication Data
US 2017/0159425 A1 Jun. 8, 2017

Related U.S. Application Data (60) Provisional application No. 62/262,893, filed on Dec. 3, 2015.

(51) Int. Cl.
*E21B 47/14* (2006.01)
*E21B 47/12* (2012.01)

(52) U.S. Cl.
CPC .................. *E21B 47/122* (2013.01)

(58) Field of Classification Search
CPC ........................ E21B 47/122–47/123
(Continued)

(56) References Cited

U.S. PATENT DOCUMENTS 3,264,994 A 8/1966 Leutwyler Kurt
5,576,703 A 11/1996 MacLeod et al.
(Continued)

OTHER PUBLICATIONS de Almeida Jr.; et al.; "A Review of Telemetry Data Transmission in Unconventional Petroleum Enviroments Focused on Information Density and Reliability"; 2015; Journal of Software Engineering and Applications, 8 pages.
(Continued)

*Primary Examiner* — Qutbuddin Ghulamali
(74) *Attorney, Agent, or Firm* — Cantor Colburn LLP (57) ABSTRACT

An embodiment of a system for communication with a downhole component includes a downhole component configured to be disposed in a first borehole in an earth formation, the first borehole including a first electrically conductive component, and a power source electrically connected via a conductor to the first conductive component and to a second electrically conductive component disposed in a second borehole, the power source configured to induce a voltage difference between the first conductive component and the second conductive component, the voltage difference causing electrical signals to propagate along an electric circuit that includes the first conductive component, the second conductive component and a region of an earth formation between the first borehole and the second borehole. The system a processor configured to control the power source and the voltage difference to transmit an electrical signal between the downhole component and a communication device via the electric circuit.

20 Claims, 6 Drawing Sheets

(58) Field of Classification Search
USPC .................................................... 340/846.6
See application file for complete search history.

(56) References Cited

U.S. PATENT DOCUMENTS

| | | |
|---|---|---|
| 6,556,144 B1 | 4/2003 | Roberts et al. |
| 7,126,492 B2 | 10/2006 | Wisler et al. |
| 7,997,338 B2 | 8/2011 | Foster et al. |
| 8,225,861 B2 | 7/2012 | Foster et al. |
| 8,371,374 B2 | 2/2013 | Foster et al. |
| 8,555,960 B2 | 10/2013 | Mailand et al. |
| 2006/0086497 A1 | 4/2006 | Ohmer et al. |
| 2013/0306374 A1 | 11/2013 | Wood |
| 2014/0002089 A1 | 7/2014 | Wood et al. |
| 2014/0182861 A1 | 7/2014 | Wood et al. |
| 2015/0114621 A1 | 4/2015 | Wood et al. |
| 2015/0114664 A1 | 4/2015 | Hulsewe et al. |
| 2015/0122489 A1 | 5/2015 | Wood et al. |
| 2015/0122493 A1 | 5/2015 | Wood et al. |
| 2015/0129218 A1 | 5/2015 | Wright et al. |
| 2015/0330200 A1 | 11/2015 | Richard et al. |
| 2015/0354334 A1 | 12/2015 | Richard et al. |
| 2016/0032683 A1 | 2/2016 | Wood et al. |
| 2016/0138373 A1 | 5/2016 | Wood et al. |
| 2016/0265343 A1* | 9/2016 | Donderici ............. E21B 43/305 |
| 2016/0273341 A1* | 9/2016 | Wu ........................ G01V 3/26 |
| 2017/0229893 A1 | 8/2017 | Sequera et al. |

OTHER PUBLICATIONS

International Search Report and the Written Opinion of the International Searching Authority; PCT/US2016/064667; Korean Intellectual Property Office; dated Feb. 28, 2017; 8 pages.

* cited by examiner

COMMUNICATION USING ELECTRICAL SIGNALS TRANSMITTED THROUGH EARTH FORMATIONS BETWEEN BOREHOLES

CROSS REFERENCE TO RELATED APPLICATIONS

This application claims the benefit of an earlier filing date from U.S. Provisional Application Ser. No. 62/262,893 filed Dec. 3, 2015, the entire disclosure of which is incorporated herein by reference.

BACKGROUND

Hydraulic fracturing of an earth formation generally requires access to the formation from inside of a borehole casing. Traditional pressure-actuated valves provide access to the formation to begin the hydraulic fracturing process. Activation of pressure-actuated valves is achieved by applying pressure at the surface, which requires pumping equipment and large volumes of fracturing fluid. Typically, applied pressure acts on a frangible triggering device that floods a valve's drive chamber, which in turn causes the valve to shift into the open position. After the valve is shifted into the open position, it can be used for various purposes, including hydraulic fracturing, providing a flow path to pump down a ball for a ball-activated fracture sleeve, and/or for pumping down a composite fracture plug. In some cases, hydraulic fracturing is performed at multiple locations or zones, which can be located at large distances from the surface. This can present challenges in communicating and monitoring the zones.

SUMMARY

An embodiment of a system for communication with a downhole component includes a downhole component configured to be disposed in a first borehole in an earth formation, the first borehole including a first electrically conductive component, and a power source electrically connected via a conductor to the first conductive component and to a second electrically conductive component disposed in a second borehole, the power source configured to induce a voltage difference between the first conductive component and the second conductive component, the voltage difference causing electrical signals to propagate along an electric circuit that includes the first conductive component, the second conductive component and a region of an earth formation between the first borehole and the second borehole. The system also includes a processor configured to control the power source and the voltage difference to transmit an electrical signal between the downhole component and a communication device via the electric circuit.

A embodiment of a method of communicating with a downhole component includes electrically connecting a power source to a downhole component disposed in a first borehole in an earth formation, the first borehole including a first electrically conductive component, and disposing a second conductive component in a second borehole so that a portion of the second conductive component is within a selected distance from the first conductive component, and electrically connecting the power source to the second conductive component inducing a voltage difference between the first conductive component and the second conductive component, the voltage difference causing electrical signals to propagate along an electric circuit that includes the first conductive component, the second conductive component and a region of an earth formation between the first borehole and the second borehole. The method also includes controlling the power source and the voltage difference to transmit an electrical signal between the downhole component and a communication device via the electric circuit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Systems and methods are provided for wireless communication with downhole components. Such communication may include transmission of signals, power, data, instructions and/or other communications between components of a system configured to perform energy industry operations, such as hydrocarbon exploration, measurement, stimulation and/or production operations. An embodiment of a communication system is configured to generate a voltage difference between a first borehole (a "subject borehole") and a second borehole (a "communication borehole") and thereby induce an electric current through a formation between the boreholes. In one embodiment, an electric current is generated through one or more downhole components in the communication borehole, through a formation region between the boreholes and through one or more downhole components in the subject borehole for transmission of communications between a downhole component in the subject borehole and a communication device. The communication device may be located, e.g., at a surface location or in the communication borehole.

The voltage difference may be induced via one or more surface conductors that connect the wellheads, drilling rigs or other surface equipment connected to the subject borehole and the communication borehole. An electrical circuit is formed by the one or more surface conductors, downhole components (e.g., drill strings, production strings, coiled tubing, etc.) in the subject and communication borehole and a formation region between the subject and communication borehole. For example, electric current is induced in a casing and/or borehole string (e.g., drill string and/or production string) of each borehole. Communications may be performed via embodiments described herein for various purposes, such as receiving measurements from downhole sensors and transmitting instructions or otherwise controlling downhole components such as packers and inflow valves. In one embodiment, the communication borehole is disposed at a position relative to the subject borehole such that there is a distance therebetween that is small enough to permit current or signals to be transmitted through the formation. The position and/or distance may be based on estimations of formation resistivity.

Figure 1:
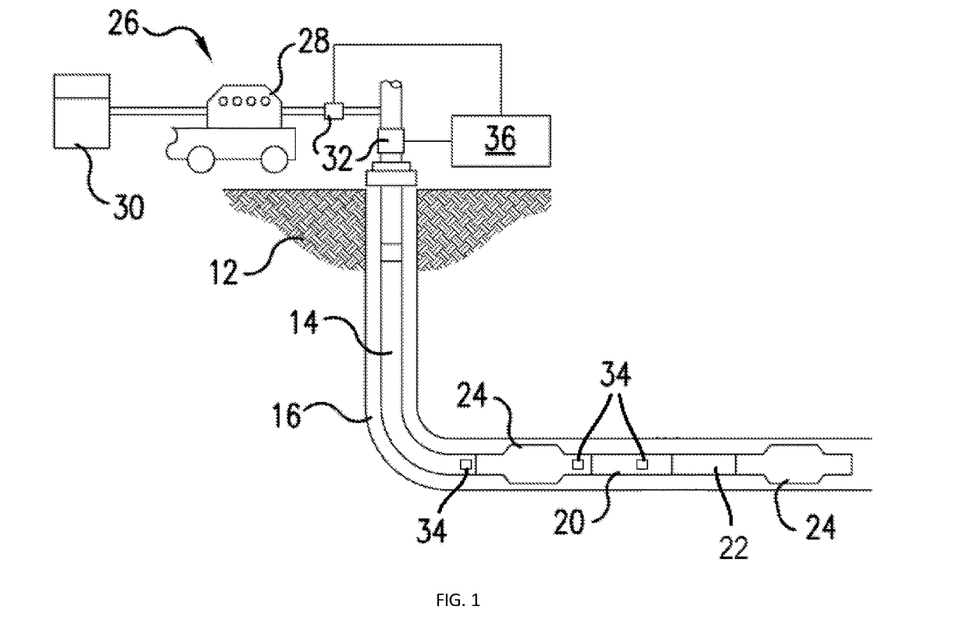
FIG. 1 depicts an embodiment of a system for performing an energy industry operation.

Referring to FIG. 1, an exemplary embodiment of a system 10 for performing energy industry operations is shown. The system 10, in the embodiment of FIG. 1, is a hydrocarbon production and/or stimulation system 10 configured to produce and/or stimulate production of hydrocarbons from an earth formation 12. The system 10 is not so limited, and may be configured to perform any energy industry operation, such as a drilling, stimulation, measurement and/or production operation.

A borehole string 14 is configured to be disposed in a borehole 16 that penetrates the formation 12. The borehole 16 may be an open hole, a cased hole or a partially cased hole. In one embodiment, the borehole string 14 is a stimulation or injection string that includes a tubular, such as a coiled tubing, pipe (e.g., multiple pipe segments) or wired pipe, that extends from a wellhead at a surface location (e.g., at a drill site or offshore stimulation vessel). As described herein, a "string" refers to any structure or carrier suitable for lowering a tool or other component through a borehole or connecting a drill bit to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHAs and drill strings.

In one embodiment, the system 10 is configured as a hydraulic stimulation system. As described herein, "hydraulic stimulation" includes any injection of a fluid into a formation. A fluid may be any flowable substance such as a liquid or a gas, and/or a flowable solid such as sand. In this embodiment, the string 14 includes a stimulation assembly 18 that includes one or more tools or components to facilitate stimulation of the formation 12. For example, the string 14 includes a fracturing assembly 20, such as a fracture or "frac" sleeve device, and/or a perforation assembly 22. Examples of the perforation assembly 22 include shaped charges, torches, projectiles and other devices for perforating the borehole wall and/or casing. The string 14 may also include additional components, such as one or more isolation or packer subs 24.

One or more of the stimulation assembly 18, the fracturing assembly 20, the perforation assembly 22 and/or packer subs 24 may include suitable electronics or processors configured to communicate with a surface processing unit and/or control the respective tool or assembly.

The system 10 includes surface equipment 26 for performing various energy industry operations. For example, the surface equipment 26 is configured for injection of fluids into the borehole 16 in order to, e.g., fracture the formation 12. In one embodiment, the surface equipment 26 includes an injection device such as a high pressure pump 28 in fluid communication with a fluid tank 30, mixing unit or other fluid source or combination of fluid sources. The pump 28 injects fluid into the string 14 or the borehole 16 to introduce fluid into the formation 12, for example, to stimulate and/or fracture the formation 12. The pump 28 may be located downhole or at a surface location.

One or more flow rate and/or pressure sensors 32 may be disposed in fluid communication with the pump 28 and the string 14 for measurement of fluid characteristics. The sensors 32 may be positioned at any suitable location, such as proximate to (e.g., at the discharge output) or within the pump 28, at or near the wellhead, or at any other location along the string 14 or the borehole 16. The sensors described herein are exemplary, as various types of sensors may be used to measure various parameters. Other sensors may be incorporated downhole, such as pressure and/or temperature sensors 34.

A processing unit 36 may be disposed in operable communication with downhole components such as the sensors 32, the sensors 34 and/or the pump 28. In one embodiment, the processing unit 36 communicates with downhole components via a communication borehole as discussed further below.

The processing unit 36 is configured to receive, store and/or transmit data generated from the sensors 32 and/or the pump 28, and includes processing components configured to analyze data from the pump 28 and the sensors, provide alerts to the pump 28 or other control unit and/or control operational parameters. The processing unit 36 includes any number of suitable components, such as processors, memory, communication devices and power sources.

Figure 2:
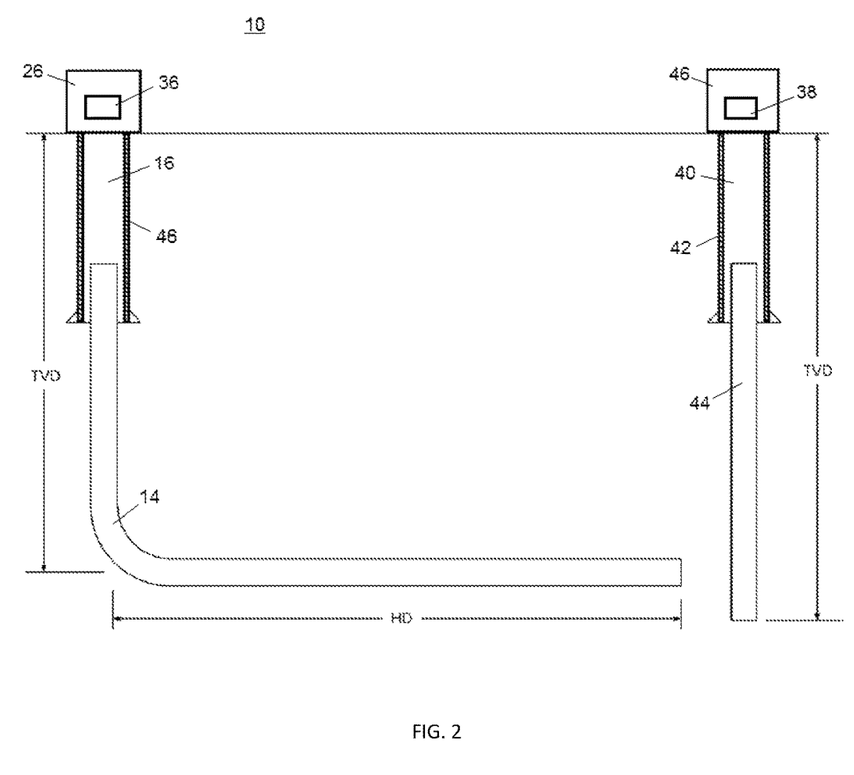
FIG. 2 depicts an embodiment of a communication system configured to transmit and/or receive electrical signals between multiple boreholes.

FIG. 2 illustrates an embodiment of the system 10 including a communication system configured to effect communication with downhole components of the borehole 16. The communication system includes a communication device 38 that is electrically connected to one or more conductive downhole components in a second borehole 40 that is separate from the borehole 16. For example, the communication device 38 is connected via suitable wiring to a casing 42 made from a conductive material such as steel, and/or to a borehole string 44, which may be made from conductive components such as steel pipe sections or coiled tubing. The borehole 16 includes conductive components such as the borehole string 14 and/or casing 46.

In the embodiment of FIG. 2, the boreholes 16 and 40 are pre-existing offset wells, but are not so limited. In this embodiment, the borehole 16 includes a vertical section and a deviated section. A "deviated" section refers to a section of a borehole having a deviation from a vertical section, which may be in a horizontal direction or other direction other than vertical. The deviated section can extend significant distances from the vertical section (e.g., up to thousands of feet). In this embodiment, the borehole 40 only has a vertical section, but is not limited thereto and may also have deviated or horizontal sections, True vertical depth (TVD) of the borehole 16 is defined by the vertical section, and the horizontal or deviated depth or displacement (HD) is defined by the length of the horizontal section. The horizontal depth may not be truly in the horizontal direction as explained above. The total depth of the well equals the sum of the true vertical depth and the horizontal depth. In one embodiment, the total depth of the well is at least 1,000 feet. The total depth of the borehole 40 in this embodiment is defined by its vertical section. The borehole 40 may be any type of borehole used for any purpose, such as a dedicated well for communication, an offset well, or separate borehole for exploration and/or production. For example, the borehole 40 may be in production or abandoned. It is noted that the number, location, path or other characteristics of the boreholes are not limited to the embodiments described herein.

The communication device 38 is configured to transmit current, power and/or communications to or from downhole components via electric current generated by inducing a voltage difference across the boreholes 16 and 40. By inducing the voltage difference, current is generated through conductive components in each borehole (e.g., electrically conductive casing and/or borehole string), and through a region of a formation between the boreholes 16 and 40. The earth between the boreholes serves as a medium to close an electrical circuit for current flow, so effectively the ground between the boreholes represents a conductor with electrical resistance of the formation. An electrical circuit is completed by electrically connecting the boreholes, e.g., by electrically connecting the surface equipment 26 via electrical wires to the surface equipment 46. Surface equipment may include drilling rigs, well heads, fracturing heads, or otherwise depending on the stage of the well. In this embodiment, the borehole 16 is considered the subject borehole and the borehole 40 is considered the communication borehole, although the borehole 40 could be configured as the subject borehole with the borehole 16 being the communication borehole.

Proximity of the communication borehole (e.g., the borehole 40) to conductive components in the subject borehole (e.g., the casing 46 and/or string 14 of the borehole 16) at any point throughout its length is relevant to ensure current flow. The borehole 40 may be positioned, e.g., by drilling with modern directional drilling) so that conductive components in the borehole 40 are within a sufficient proximity of the borehole 16 to allow a low resistance path through the formation for the electric current. Electrical signals transmitted via the circuit may be used to, e.g., charge batteries or to communicate with completion tools installed on the casing string.

In one embodiment, a proximity radius is estimated to establish distances that would be sufficiently small to allow for current conduction. The proximity radius may be defined by analysis of conductivity or resistivity of the formation(s) neighboring the subject borehole.

Distances between the subject borehole and communication borehole(s) are selected so that electromagnetic radiation emitted from the subject borehole is received with sufficient energy to allow for communication. As electromagnetic waves advance through earth, the amount of energy in a given area decreases as distance from the source increases. Thus, the subject well is positioned relative to a communication borehole so that one or more conductive components therein are within a radius of communication borehole(s). The radius may be defined by analysis of conductivity of the formation to allow for favorable current conductivity through the earth's formation and the closing of the electrical circuit. In one embodiment, the subject borehole may be directionally drilled to intentionally land, bypass or penetrate highly electrically conductive zones or highly resistive zones as determined by existing location and orientation of communication borehole(s) and analysis of the conductivity of the formation.

Figure 3:
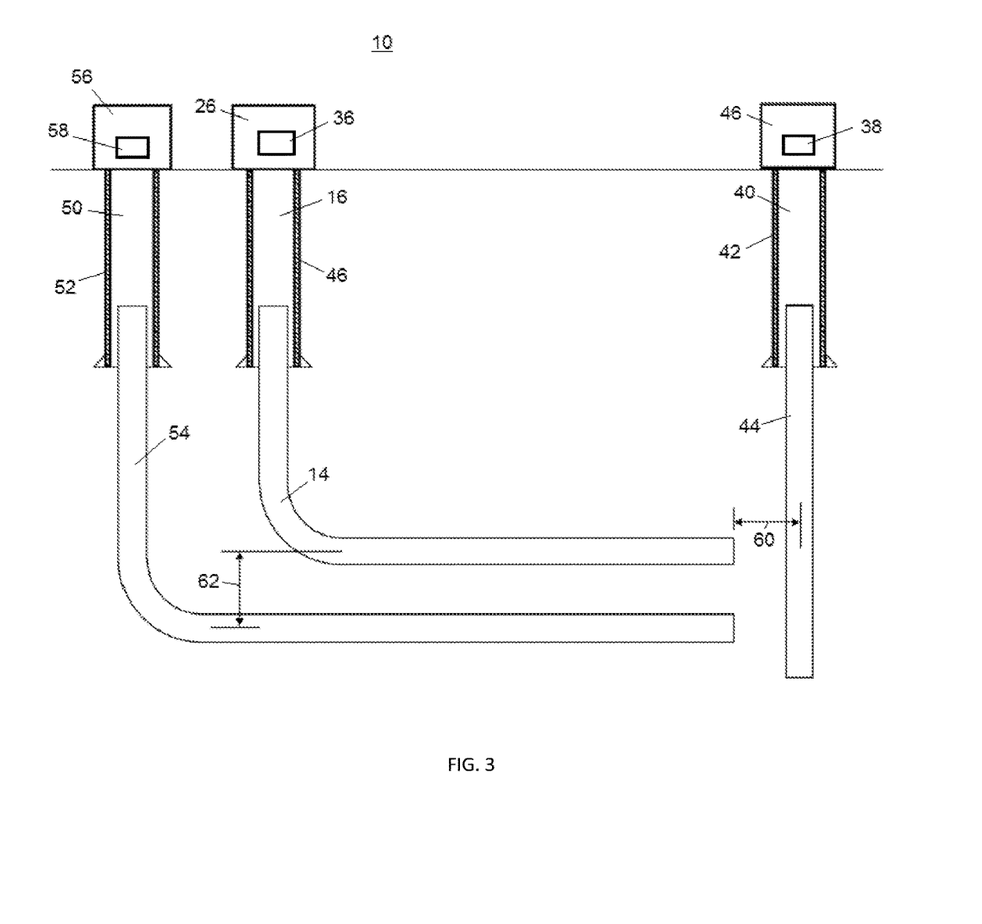
FIG. 3 depicts an embodiment of a communication system configured to transmit and/or receive electrical signals between multiple boreholes.
Figure 4:
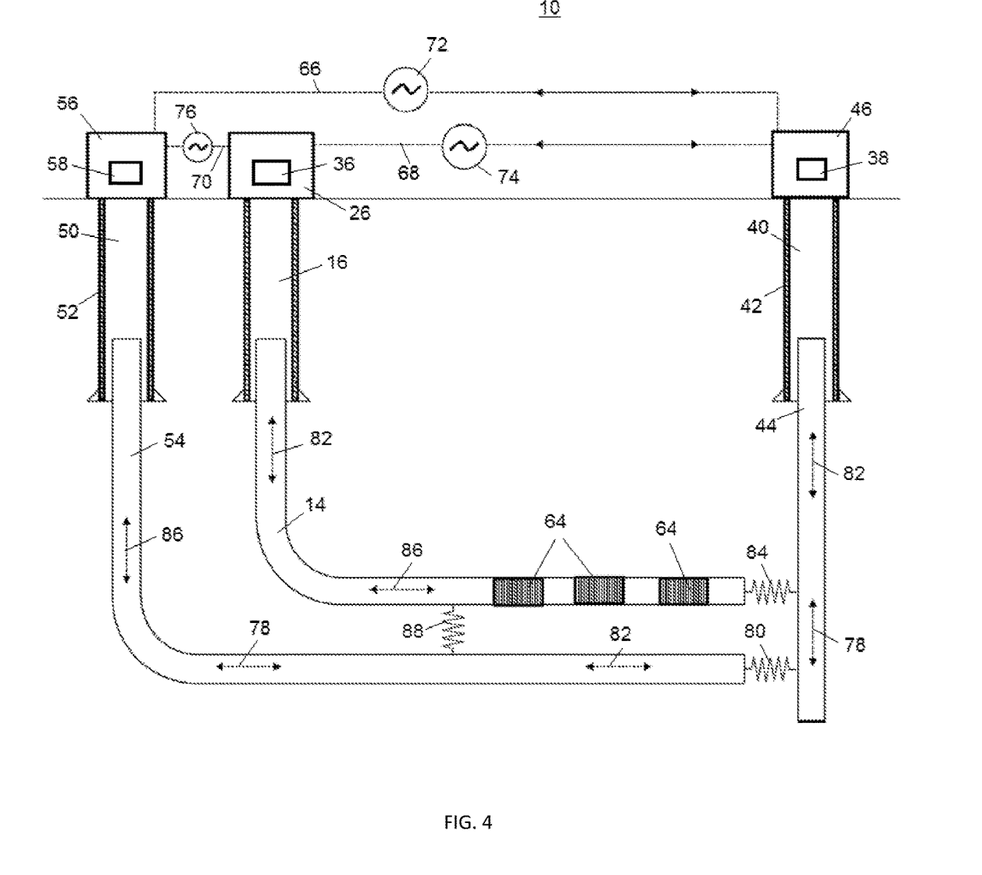
FIG. 4 depicts an embodiment of a communication system including power sources and electrical connections between boreholes configured to establish electrical circuits for communication.

FIGS. 3 and 4 show an embodiment of the system 10 that includes the borehole 16 configured as the subject borehole, and multiple boreholes 40 and 50 configured as communication boreholes for communication with the borehole 16. Casing 52 and/or downhole components such as a production string 54 are disposed in the borehole 50 and connected to surface equipment 56 (e.g., a drilling rig, well head, fracturing head or other). The surface equipment may include a communication device 58. It is understood that location, orientation and total depth of the boreholes may differ from those of the embodiments described herein and are not limited to those exposed herein as indicated above.

As shown in FIG. 3, the borehole 40 is located so that the string 44 is at a selected distance 60 that is within a proximity range selected so that current can flow through the formation between the string 14 and the string 44. Likewise, borehole 50 is located at a selected distance 62 that is within a proximity range selected so that current can flow between the string 54 and the string 44. The distance may be calculated based on the resistivity of the formation, which can be estimated, e.g., by performing resistivity measurements or based on pre-existing information describing the formation characteristics.

Referring to FIG. 4, a voltage difference may be established between the subject borehole and the communication borehole(s) (e.g., the borehole 16 and the boreholes 40 and/or 50) to effectively create an electrical circuit including the electrically conductive casing or other conductive components of subject and communication boreholes, and the formation between the boreholes. The electrical circuit is used to communicate with downhole components such one or more devices 64 (e.g., inflow valves, injection devices, packers and/or sensors) along the length of the horizontal section of the borehole 16. The devices are illustrated schematically and could include any combination of tools, devices, components, or mechanisms that are arranged to facilitate any phase of the life of the subject well 16, such as drilling, completion, production, etc. For example, the devices 64 could include sensors (e.g., for monitoring pressure, temperature, flow rate, water and/or oil composition, dielectric or resistance properties of borehole fluids, etc.), chokes, valves, sleeves, inflow control devices, packers, etc., or a combination including any of the above.

FIG. 4 illustrates an example of connections between the boreholes that close the electrical circuit. In this example, surface equipment and conductive components of the boreholes are interconnected via electrical wires 66, 68 and 70 to close the electrical circuit. Power sources 72, 74 and 76 are placed to induce electrical currents through the borehole 16 and the borehole 50 and/or 40. The power sources may be incorporated or connected to corresponding processing and/or control units.

Any combination of boreholes and respective components can be used to create a circuit. For example, the power source 72 can be activated (and optionally modulated) to generate an electric current 78 that flows through a circuit formed by the string 44, a region of the formation (shown as resistor 80) and the string 54. In another example, the power source 74 can be activated to generate an electric current 82 that flows through a circuit formed by the string 44, a region of the formation (shown as resistor 84) and the string 14. In a further example, the power source 76 can be activated to generate an electric current 86 that flows through a circuit formed by the string 14, a region of the formation (shown as resistor 88) and the string 54.

Modulation of current induced can be controlled by the power source itself or by a processing device such as the communication device 36, 38 and/or 58. The power sources and/or processing devices could be, include, or be included with a wellhead, a drill rig, operator consoles, associated equipment, or other surface device to enable control and/or observation of downhole tools, devices, parameters, conditions, etc. Regardless of the particular embodiment, operators can be in signal and/or data communication with the devices 64, e.g., using various computing devices, control panels, display screens, monitoring systems, and other devices known in the art.

Figure 5:
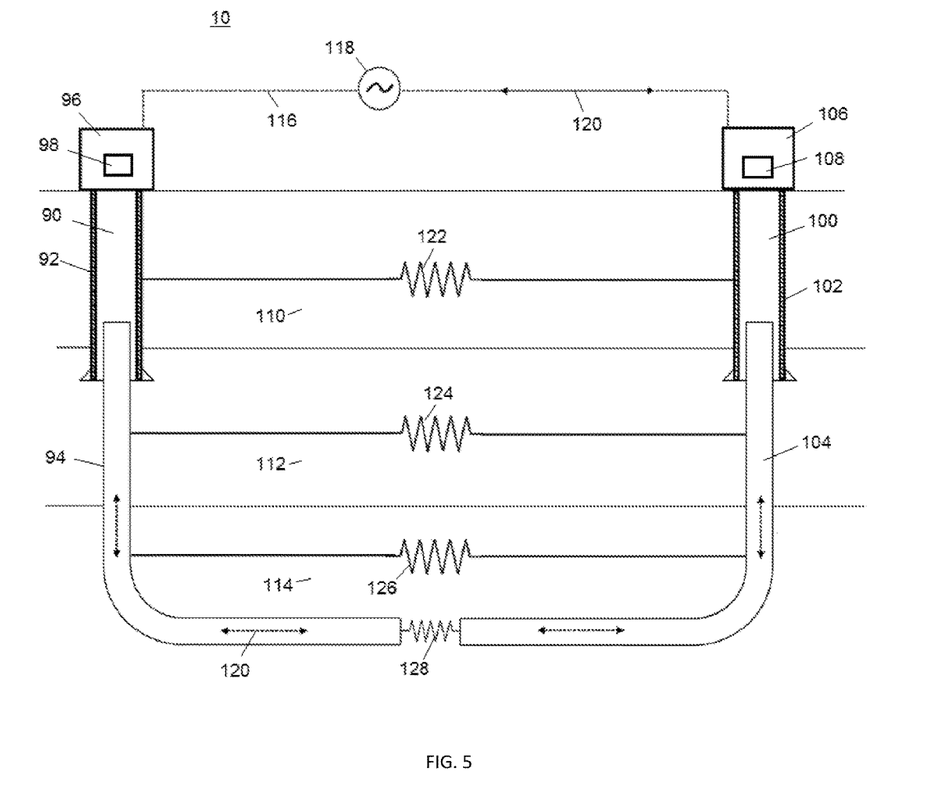
FIG. 5 depicts an embodiment of a communication system configured to transmit and/or receive electrical signals between multiple boreholes disposed in formation layers having different characteristics.

In one embodiment, the system 10 is configured to transmit electrical signals between formations or formation regions that have different characteristics. An example is shown in FIG. 5, which shows a first borehole 90 that includes a conductive casing 92 and/or a conductive component such as a borehole string 94 connected to surface equipment 96 that may include a communication device 98. A second borehole 100 includes a conductive casing 102 and/or a conductive component such as a borehole string 104 connected to surface equipment 106 that may include a communication device 108. The boreholes extend through multiple formations 110, 112 and 114, and are electrically connected via a conductor 116 and a power source 118.

It is understood that there may be numerous geological formations with different thicknesses and this embodiment is not limited to the any particular formation. Resistivity of each formation is shown in the form of electrical resistances 122, 124 and 126. Each formation can be considered to effectively represent an electrical resistance defined by its resistivity, which can be obtained via well logging methods well known in the art.

If an electrical current source (i.e. voltage differential) is applied, a current flow 120 is induced through all available flow paths between the boreholes 90 and 100, i.e. through the electrical resistances 122, 124 and 126. The distribution of the current is a function of the resistivity in each formation as follows:

$$I = \frac{V * A}{\rho * L},$$

where I is the current flowing through the formation, V is the voltage difference applied across the boreholes 90 and 100, A is the cross sectional area through which current is flowing, $\rho$ is the resistivity of the formation and L is the distance between vertical sections of the boreholes 90 and 100. Current through each formation is inversely proportional to its resistivity and to the distance between vertical sections. On the other hand, resistivity of the metal strings 94 and 104 are orders of magnitude less than that typical of any earth formation, thus current flow is favorable through the metal strings.

The boreholes 90 and 100 may be drilled to maximize current flow through the metal strings by minimizing the distance between the toes of the boreholes, thus closing the electrical circuit via an electrical resistance 128. Simultaneously, the distance between vertical sections of the borehole should be maximized to increase the effective electrical resistance of the formations 110 and 112 by increasing the length of the path through which electric current would have to flow and favoring flow through the metal string and through a relatively short section of earth formation, represented by resistance 128.

In one embodiment, as current flow is proportional to the area through which current is flowing, the boreholes may be positioned so that horizontal or deviated sections of the boreholes overlap in order to increase current-flow area through the formation and the metal strings. It is understood that overlapping means that all or partial sections of the horizontal sections of the offset and subject boreholes are at least substantially parallel to each other, or at least as parallel as is feasible due to the nature of the formation. In this way, an electrical circuit is closed between two or more boreholes directionally drilled so that their horizontal sections overlap and/or are near each other, while the distance between the vertical sections is maximized or at least significantly greater than the distance between deviated sections. This allows for maximum electrical current flow through the strings and minimum current flow through relatively long electrical resistance created by earth formations.

In one embodiment, conductive materials may be injected into a formation region between a subject borehole and communication borehole(s) to facilitate communication. For example, two or more boreholes may be electrically interconnected by means of electrically conductive hydraulic fracturing fluid or other electrically conductive fluid migrating from the subject borehole to the communication borehole(s) or vice versa. In this example, the electrical resistance 128 is that of the electrically conductive fluid.

Figure 6:
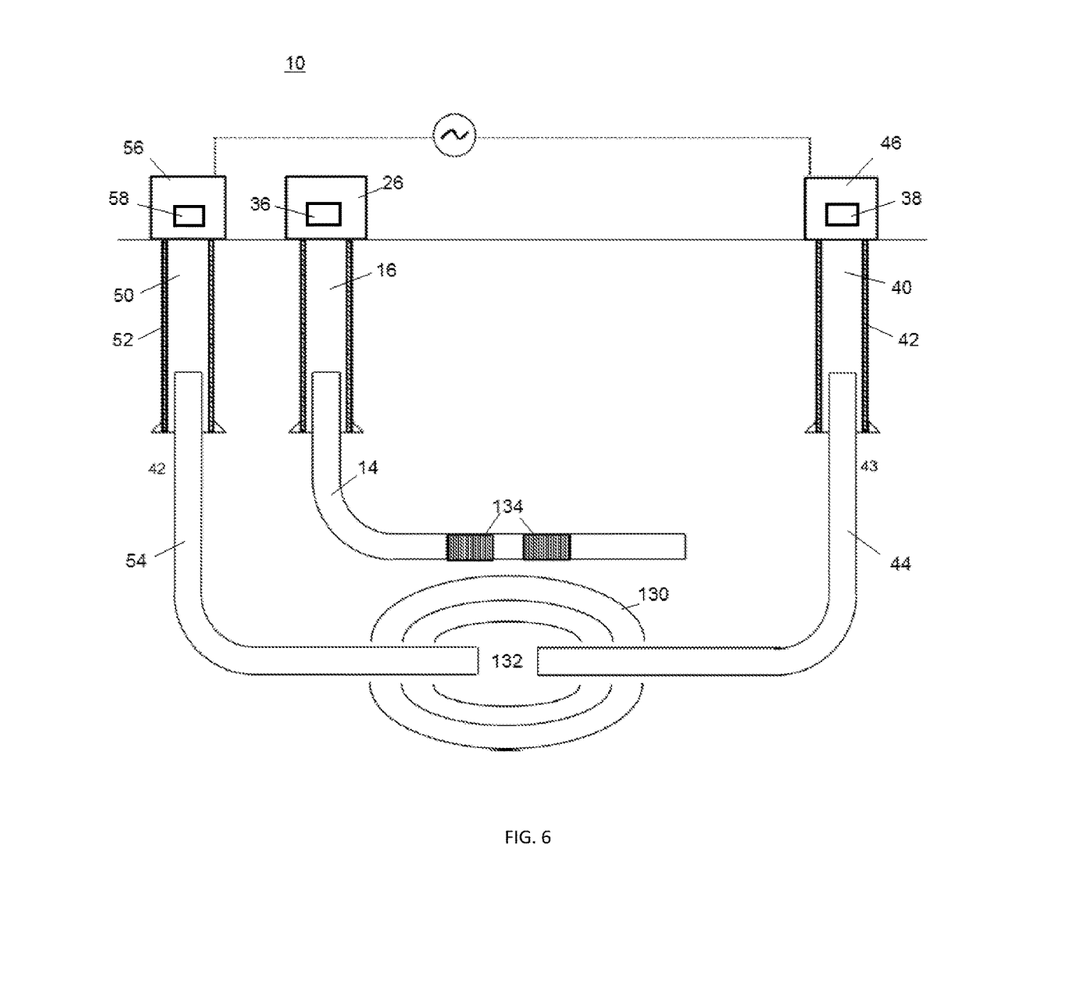
FIG. 6 depicts an embodiment of a communication system configured to transmit and/or receive electrical signals via electromagnetic waves generated in a formation between multiple boreholes.

FIG. 6 shows an embodiment of the system 10 configured for electromagnetic (EM) telemetry or communication with a downhole component. In this embodiment, the boreholes and associated strings are paired so that each acts as a single leg of a dipole antenna that is capable of transmitting or receiving EM waves 130 in a downhole formation. A formation region 132 between the two paired directional wells acts as the necessary electric insulation between legs of the dipole antenna. Since the power source, receiver and transmitter are located on the surface, multiple low power transmitter and/or receiver nodes 134 in other boreholes such as the borehole 16 can be linked back to surface and bilateral communication can be established between surface and downhole equipment.

Embodiments described herein may be utilized in various methods that include performing an energy industry operation and/or communicating with a downhole component. The method may be performed in conjunction with the system 10 of FIGS. 3 and 4, but is not so limited.

An example of a method includes drilling a communication borehole (e.g., the borehole 40 and/or the borehole 50) using, e.g., modern directional drilling tools, so that a section of the communication borehole and/or the toe of the borehole is at a selected distance (e.g., from a subject borehole (e.g., the borehole 16). The distance (e.g., the distance 60 and/or 62) is selected based on characteristics including formation resistivity to effectively create an electrical circuit including the electrically conductive casing, string and/or other components of the subject and communication borehole, and the formation between the boreholes.

A processor such as the communication device 38 controls and may modulate a voltage between the wellhead or other surface equipment of the boreholes to establish communication between surface equipment and tools downhole. The communication may be used for various purposes, such as supplying power to downhole components, transmitting data to or from downhole components, controlling operational parameters and/or controlling specific components. For example, the communication device 38 communicates to open valves, send and receive pertinent data, such as pressure and temperature, and charge downhole batteries without the need to apply pressure on surface.

Embodiments described herein have numerous advantages, including the ability to monitor and communication with downhole components in the subject well without the need to apply fluid pressure to the subject borehole at the surface. This addresses the limitations of conventional electromagnetic (EM) and other methods of communication, e.g., in long boreholes. Examples of other advantages include: (1) there is potentially no limit on the number of discrete fracture stages and fracture valves that can be communicated with, (2) there is the option to fracture stages in any order, (3) fracture balls and/or seats are not necessary, (4) there is no pre- or post-fracture diameter restrictions, (5) improved productivity and less fracture water, (6) significantly less fracture equipment is required, (7) no wire line or coiled tubing intervention before, during or after a fracture job or other operation is necessary.

Set forth below are some embodiments of the foregoing disclosure:

Embodiment 1

A system for communication with a downhole component, comprising: a downhole component configured to be disposed in a first borehole in an earth formation, the first borehole including a first electrically conductive component; a power source electrically connected via a conductor to the first conductive component and to a second electrically conductive component disposed in a second borehole, the power source configured to induce a voltage difference between the first conductive component and the second conductive component, the voltage difference causing electrical signals to propagate along an electric circuit that includes the first conductive component, the second conductive component and a region of an earth formation between the first borehole and the second borehole; and a processor configured to control the power source and the voltage difference to transmit an electrical signal between the downhole component and a communication device via the electric circuit.

Embodiment 2

The system of any prior embodiment, wherein the processor is configured to control a parameter of an energy industry operation based on the electrical signal.

Embodiment 3

The system of any prior embodiment, wherein the processor includes a modulation device configured to at least one of: modulate the power source to generate an encoded signal and decode the electrical signal.

Embodiment 4

The system of any prior embodiment, wherein the conductor is disposed at a surface location and is configured to connect surface equipment of the first borehole to surface equipment of the second borehole.

Embodiment 5

The system of any prior embodiment, wherein the conductor, the first conductive component, the second conductive component and the region of the earth formation form a closed electrical circuit.

Embodiment 6

The system of any prior embodiment, wherein a portion of the second borehole and the second conductive component are located in the formation within a selected distance of the first conductive component, the selected distance based on a resistivity of the formation.

Embodiment 7

The system of any prior embodiment, wherein the first borehole and the second borehole each include a substantially vertical section, the substantially vertical sections spaced by another distance selected based on a resistivity of the formation to prevent electrical signals from propagating therebetween.

Embodiment 8

The system of any prior embodiment, wherein at least one of the first borehole and the second borehole includes a deviated section, a portion of the deviated section establishing the selected distance, the selected distance being less than the another distance.

Embodiment 9

The system of any prior embodiment, further comprising a third borehole including a third conductive component, the second conductive component and the third conductive component configured to form legs of a dipole antenna and perform at least one of: transmitting electromagnetic signals to a receiver in the first borehole, and receiving electromagnetic signals from a transmitter in the first borehole.

Embodiment 10

The system of any prior embodiment, wherein at least one of the first borehole and the second borehole is configured to inject a conductive fluid in the region of the formation.

Embodiment 11

A method of communicating with a downhole component, comprising: electrically connecting a power source to a downhole component disposed in a first borehole in an earth formation, the first borehole including a first electrically conductive component; disposing a second conductive component in a second borehole so that a portion of the second conductive component is within a selected distance from the first conductive component, and electrically connecting the power source to the second conductive component; inducing a voltage difference between the first conductive component and the second conductive component, the voltage difference causing electrical signals to propagate along an electric circuit that includes the first conductive component, the second conductive component and a region of an earth formation between the first borehole and the second borehole; and controlling the power source and the voltage difference to transmit an electrical signal between the downhole component and a communication device via the electric circuit.

Embodiment 12

The method of any prior embodiment, wherein the controlling includes adjusting a parameter of an energy industry operation based on the electrical signal.

Embodiment 13

The method of any prior embodiment, wherein the processor includes a modulation device configured to at least one of: modulate the power source to generate an encoded signal and decode the electrical signal.

Embodiment 14

The method of any prior embodiment, wherein the first conductive component and the second conductive component are electrically connected by a conductor disposed at a surface location.

Embodiment 15

The method of any prior embodiment, wherein the conductor, the first conductive component, the second conductive component and the region of the earth formation form a closed electrical circuit.

Embodiment 16

The method of any prior embodiment, wherein the selected distance is based on a resistivity of the formation.

Embodiment 17

The method of any prior embodiment, wherein the first borehole and the second borehole each include a substantially vertical section, the substantially vertical sections spaced by another distance selected based on a resistivity of the formation to prevent electrical signals from propagating therebetween.

Embodiment 18

The method of any prior embodiment, wherein at least one of the first borehole and the second borehole includes a deviated section, a portion of the deviated section establishing the selected distance, the selected distance being less than the another distance.

Embodiment 19

The method of any prior embodiment, further comprising disposing a third conductive component in a third borehole, the second conductive component and the third conductive component configured to form legs of a dipole antenna, and controlling the power source includes at least one of: transmitting electromagnetic signals to a receiver in the first borehole, and receiving electromagnetic signals from a transmitter in the first borehole.

Embodiment 20

The method of any prior embodiment, wherein at least one of the first borehole and the second borehole is configured to inject a conductive fluid in the region of the formation.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for communication with a downhole component, comprising:
the downhole component configured to be disposed in a first borehole in an earth formation, the first borehole including a first electrically conductive component;
a power source electrically connected via a conductor to the first electrically conductive component in the first borehole and to a second electrically conductive component disposed in a second borehole, the power source configured to induce a voltage difference between the first electrically conductive component and the second electrically conductive component, the voltage difference causing electrical signals to propagate along an electric circuit that includes the first electrically conductive component, the second electrically conductive component and a region of an earth formation between the first borehole and the second borehole; and
a processor configured to control the power source and the voltage difference to transmit an electrical signal comprising at least one of data and instructions between the downhole component and a communication device via the electric circuit.

2. The system of claim 1, wherein the processor is configured to control a parameter of an energy industry operation based on the electrical signal.

3. The system of claim 1, wherein the processor includes a modulation device configured to at least one of: modulate the power source to generate an encoded signal and decode the electrical signal.

4. The system of claim 1, wherein the conductor is disposed at a surface location and is configured to connect surface equipment of the first borehole to surface equipment of the second borehole.

5. The system of claim 4, wherein the conductor, the first conductive component, the second conductive component and the region of the earth formation form a closed electrical circuit.

6. The system of claim 1, wherein a portion of the second borehole and the second conductive component are located in the formation within a selected distance of the first conductive component, the selected distance based on a resistivity of the formation.

7. The system of claim 1, wherein the first borehole and the second borehole each include a substantially vertical section, the substantially vertical sections spaced by another distance selected based on a resistivity of the formation to prevent electrical signals from propagating therebetween.

8. The system of claim 7, wherein at least one of the first borehole and the second borehole includes a deviated section, a portion of the deviated section establishing the selected distance, the selected distance being less than the another distance.

9. The system of claim 1, further comprising a third borehole including a third conductive component, the second conductive component and the third conductive component configured to form legs of a dipole antenna and perform at least one of: transmitting electromagnetic signals to a receiver in the first borehole, and receiving electromagnetic signals from a transmitter in the first borehole.

10. The system of claim 1, wherein at least one of the first borehole and the second borehole is configured to inject a conductive fluid in the region of the formation.

11. A method of communicating with a downhole component, comprising:
electrically connecting a power source to a downhole component disposed in a first borehole in an earth formation, the first borehole including a first electrically conductive component;
disposing a second electrically conductive component in a second borehole so that a portion of the second conductive component is within a selected distance from the first electrically conductive component, and electrically connecting the power source to the second electrically conductive component;
inducing a voltage difference between the first electrically conductive component and the second electrically conductive component, the voltage difference causing electrical signals to propagate along an electric circuit that includes the first electrically conductive component, the second electrically conductive component and a region of an earth formation between the first borehole and the second borehole; and
controlling the power source and the voltage difference to transmit an electrical signal comprising at least one of data and instructions between the downhole component and a communication device via the electric circuit.

12. The method of claim 11, wherein the controlling includes adjusting a parameter of an energy industry operation based on the electrical signal.

13. The method of claim 11, wherein further comprising at least one of: modulating the power source using a modulation device to generate an encoded signal and decoding the electrical signal.

14. The method of claim 11, wherein the first conductive component and the second conductive component are electrically connected by a conductor disposed at a surface location.

15. The method of claim 14, wherein the conductor, the first conductive component, the second conductive component and the region of the earth formation form a closed electrical circuit.

16. The method of claim 11, wherein the selected distance is based on a resistivity of the formation.

17. The method of claim 11, wherein the first borehole and the second borehole each include a substantially vertical section, the substantially vertical sections spaced by another distance selected based on a resistivity of the formation to prevent electrical signals from propagating therebetween.

18. The method of claim 17, wherein at least one of the first borehole and the second borehole includes a deviated section, a portion of the deviated section establishing the selected distance, the selected distance being less than the another distance.

19. The method of claim 1, further comprising disposing a third conductive component in a third borehole, the second conductive component and the third conductive component configured to form legs of a dipole antenna, and controlling the power source includes at least one of: transmitting electromagnetic signals to a receiver in the first borehole, and receiving electromagnetic signals from a transmitter in the first borehole.

20. The method of claim 11, wherein at least one of the first borehole and the second borehole is configured to inject a conductive fluid in the region of the formation.

* * * * *